(12) United States Patent
Dority

(10) Patent No.: US 7,032,605 B1
(45) Date of Patent: Apr. 25, 2006

(54) DUAL PISTON ROTARY VALVE

(75) Inventor: Douglas B. Dority, 25 Castle Rock Dr., Mill Valley, CA (US) 94941

(73) Assignee: Douglas B. Dority, Mill Valley, CA (US)

( * ) Notice: Subject to any disclaimer, the term of this patent is extended or adjusted under 35 U.S.C. 154(b) by 366 days.

(21) Appl. No.: 10/687,227

(22) Filed: Oct. 15, 2003

(51) Int. Cl.
*F16K 11/10* (2006.01)

(52) U.S. Cl. .................... 137/1; 137/613; 137/883; 137/887

(58) Field of Classification Search ........... 137/613, 137/883, 861, 1, 887
See application file for complete search history.

(56) References Cited

U.S. PATENT DOCUMENTS

| | | | |
|---|---|---|---|
| 3,596,680 A * | 8/1971 | Adams | 137/887 |
| 3,645,142 A | 2/1972 | Turpin | |
| 4,231,990 A | 11/1980 | Jottier | |
| 4,506,558 A | 3/1985 | Bakalyar | |
| 4,702,889 A | 10/1987 | Cabrera et al. | |
| 4,726,237 A | 2/1988 | Yung | |
| 4,726,932 A | 2/1988 | Feier et al. | |
| 4,738,276 A * | 4/1988 | Adams | 137/887 |
| 4,752,445 A | 6/1988 | Zell | |
| 4,948,565 A | 8/1990 | Bemis et al. | |
| 4,983,523 A | 1/1991 | Li et al. | |
| 5,062,547 A | 11/1991 | Zähner et al. | |
| 5,105,851 A | 4/1992 | Fogelman | |
| 5,143,084 A | 9/1992 | Macemon et al. | |
| 5,146,950 A * | 9/1992 | Rodgers et al. | 137/883 |
| 5,250,263 A | 10/1993 | Manz | |
| 5,374,522 A | 12/1994 | Murphy et al. | |
| 5,652,141 A | 7/1997 | Henco et al. | |
| 5,856,174 A | 1/1999 | Lipshutz et al. | |
| 5,882,903 A | 3/1999 | Andrevski et al. | |
| 5,922,288 A | 7/1999 | Herst | |
| 5,922,591 A | 7/1999 | Anderson et al. | |
| 5,935,858 A | 8/1999 | Herst | |
| 6,043,080 A | 3/2000 | Lipshutz et al. | |
| 6,100,084 A | 8/2000 | Miles et al. | |
| 6,162,400 A | 12/2000 | Schembri | |
| 6,168,948 B1 | 1/2001 | Anderson et al. | |
| 6,374,684 B1 | 4/2002 | Dority et al. | |
| 2002/0131905 A1 | 9/2002 | Cordill | |

(Continued)

FOREIGN PATENT DOCUMENTS

WO    WO 99/33559    8/1999

(Continued)

*Primary Examiner*—Kevin Lee
(74) *Attorney, Agent, or Firm*—Townsend and Townsend and Crew LLP

(57) ABSTRACT

Apparatus and methods are provided for manipulating fluids, for instance, to determine the presence or absence of an analyte in a sample. In one embodiment, a fluid control and processing system comprises a plurality of chambers; a body including a fluid sample processing region; and a plurality of valves. Each valve includes a valve body having a fluid displacement region which is depressurizable to draw fluid into the fluid displacement region and pressurizable to expel fluid from the fluid displacement region, the valve body including an external port. The fluid displacement region is fluidicly coupled with the external port of the valve body. The valve body is adjustable with respect to the fluid sample processing region to place the external port selectively in fluidic communication with the fluid sample processing region. The valve body is adjustable with respect to the plurality of chambers to allow the external port to be placed selectively in fluidic communication with the plurality of chambers.

30 Claims, 19 Drawing Sheets

U.S. PATENT DOCUMENTS

2003/0072679 A1    4/2003    Johnson et al.

FOREIGN PATENT DOCUMENTS

| WO | WO 99/47255 | 9/1999 |
| WO | WO 00/72970 A1 | 12/2000 |
| WO | WO 00/73412 A2 | 12/2000 |
| WO | WO 00/73413 A2 | 12/2000 |
| WO | WO 00/73413 A3 | 12/2000 |

* cited by examiner

DUAL PISTON ROTARY VALVE

BACKGROUND OF THE INVENTION

The present invention relates generally to fluid manipulation and, more particularly, to a system and method for metering and distributing fluid for processing and analysis.

The analysis of fluids such as clinical or environmental fluids generally involves a series of processing steps, which may include chemical, optical, electrical, mechanical, thermal, or acoustical processing of the fluid samples. Whether incorporated into a bench-top instrument, a disposable cartridge, or a combination of the two, such processing typically involves complex fluidic assemblies and processing algorithms.

Conventional systems for processing fluid samples employ a series of chambers each configured for subjecting the fluid sample to a specific processing step. As the fluid sample flows through the system sequentially from chamber to chamber, the fluid sample undergoes the processing steps according to a specific protocol. Because different protocols require different configurations, conventional systems employing such sequential processing arrangements are not versatile or easily adaptable to different protocols.

U.S. Pat. No. 6,374,684, which is incorporated herein by reference in its entirety, discloses a fluid processing system that allows fluidic communication between a fluid sample processing region selectively with a plurality of chambers. The fluid flow among the fluid sample processing region and the chambers is controlled by adjusting the position of a rotary valve. The present invention is an improvement over the system disclosed in that patent.

BRIEF SUMMARY OF THE INVENTION

The present invention provides an apparatus and method for manipulating fluids, for instance, to determine the presence or absence of an analyte in a sample. In a specific embodiment, the apparatus employs a plurality of rotary valves that allow fluidic communication selectively with a fluid sample processing region and a plurality of chambers including, for example, a sample chamber, a waste chamber, a wash chamber, and the like. The fluid flow among the fluid sample processing region and the chambers is controlled by adjusting the position of the rotary valves. In this way, the metering and distribution of fluids in the apparatus can be varied depending on the specific protocol. The multiple valves operate with very little dead volume, and facilitate toggling of fluids easily with synchronous control of pressurization and depressurization of the valves. Unlike conventional devices, the fluid flow is no longer limited to a specific protocol.

In accordance with an aspect of the present invention, a fluid control and processing system comprises a plurality of chambers; a body including a fluid sample processing region; and a plurality of valves. Each valve includes a valve body having a fluid displacement region which is depressurizable to draw fluid into the fluid displacement region and pressurizable to expel fluid from the fluid displacement region. The valve body includes an external port. The fluid displacement region is fluidicly coupled with the external port of the valve body. The valve body is adjustable with respect to the fluid sample processing region to place the external port selectively in fluidic communication with the fluid sample processing region. The valve body is adjustable with respect to the plurality of chambers to allow the external port to be placed selectively in fluidic communication with the plurality of chambers.

In some embodiments, the valve bodies of the valves are separately adjustable to place the external ports of the valve bodies selectively in fluidic communication with the fluid sample processing region or with the chambers. A channel has two ends and is disposed between the valve bodies of two valves. The valve bodies of the two valves are adjustable with respect to the channel to place the two fluid displacement regions of the two valve bodies selectively in fluidic communication with the two ends of the channel. Pressurization and depressurization of the fluid displacement region of one of the two valve bodies is synchronized, respectively, with depressurization and pressurization of the fluid displacement region of the other of the two valve bodies to move a fluid back or forth between the two fluid displacement regions via the channel.

In specific embodiments, two valves are adjustable together by a single adjustment unit to place the fluid displacement regions of the two valve bodies simultaneously in fluidic communication with the fluid sample processing region in one position and to isolate the fluid displacement regions of the two valve bodies from the fluid sample processing region in another position. The external port of at least one of the valve bodies is disposed on one external port surface of the valve body. The external port surface is generally conical with respect to an axis. The valve body is rotatable around the axis of the external port surface and relative to the plurality of chambers to allow the external port to be placed selectively in fluidic communication with the plurality of chambers, the external port being spaced from the axis by a radius. The valve body is rotatable around the axis of the external port surface to allow the external port spaced from the axis by the radius to be placed selectively in fluidic communication with the fluid sample processing region. A fluid displacement member is disposed in the fluid displacement region, and is movable to adjust the volume of the fluid displacement region. The fluid displacement member comprises a piston movable in a linear direction in the fluid displacement region. The fluid sample processing region comprises an active member selected from the group consisting of a micro fluidic chip, a solid phase material, a filter, a filter stack, an affinity matrix, a magnetic separation matrix, a size exclusion column, and a capillary tube.

In accordance with another aspect of the invention, a fluid control and processing system for controlling fluid flow among a plurality of chambers comprises a body including a fluid sample processing region; and a plurality of valves. Each valve includes a valve body having a fluid displacement region which is depressurizable to draw fluid into the fluid displacement region and pressurizable to expel fluid from the fluid displacement region. The valve body includes an external port. The fluid displacement region is fluidicly coupled with the external port of the valve body. The valve body is adjustable with respect to the fluid sample processing region to place the external port selectively in fluidic communication with the fluid sample processing region. The valve body is adjustable with respect to the plurality of chambers to allow the external port to be placed selectively in fluidic communication with the plurality of chambers.

Another aspect of the present invention is directed to a method for controlling fluid flow between a plurality of valves and a plurality of chambers and a fluid processing region, each valve including an external port and a fluid displacement region fluidicly coupled with the external port. The method comprises adjusting the valves with respect to the plurality of chambers and the fluid processing region to place the external ports of the valves selectively in fluidic communication with the plurality of chambers and the fluid processing region.

In some embodiments, each valve is adjustable to close the external port so that the valve is fluidicly isolated from the chambers and the fluid processing region. One valve is adjusted to place the external port in fluidic communication with one chamber, and further comprising depressurizing the fluid displacement region of the valve to aspirate fluid from the chamber into the valve. One valve is adjusted to place the external port in fluidic communication with one chamber, and further comprising pressurizing the fluid displacement region of the valve to expel fluid from the valve into the chamber. A magnetic field is applied to the fluid processing region. The valve body of the valve is rotatable around an axis and relative to the fluid processing region and the plurality of chambers to allow the external port of the valve to be placed selectively in fluidic communication with the fluid processing region and the plurality of chambers. The valve bodies of two valves are adjusted to place the external ports of the two valve in fluidic communication with two ends of a channel, and pressurization and depressurization of the fluid displacement region of one of the two valve bodies is synchronized, respectively, with depressurization and pressurization of the fluid displacement region of the other of the two valve bodies to move a fluid back and forth between the two fluid displacement regions through the channel.

DETAILED DESCRIPTION OF THE INVENTION

Figure 1:
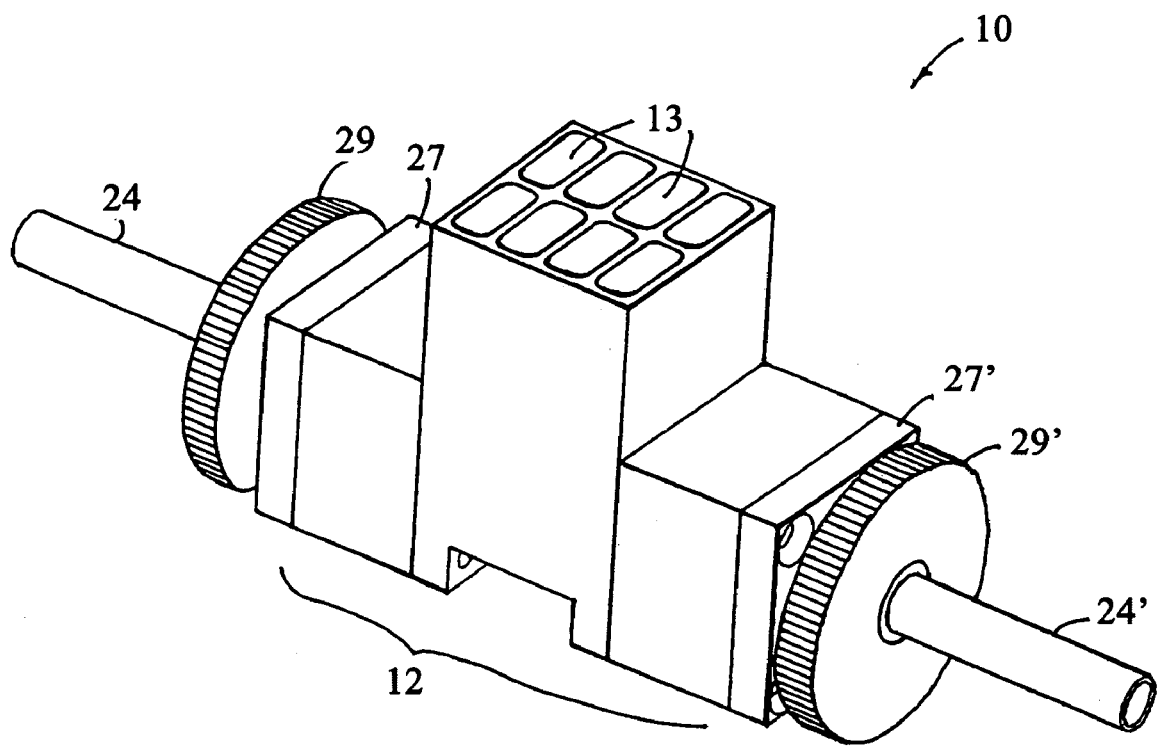
FIG. 1 is a perspective view of a fluid control and processing system employing a serial configuration according to an embodiment of the present invention.
Figure 2:
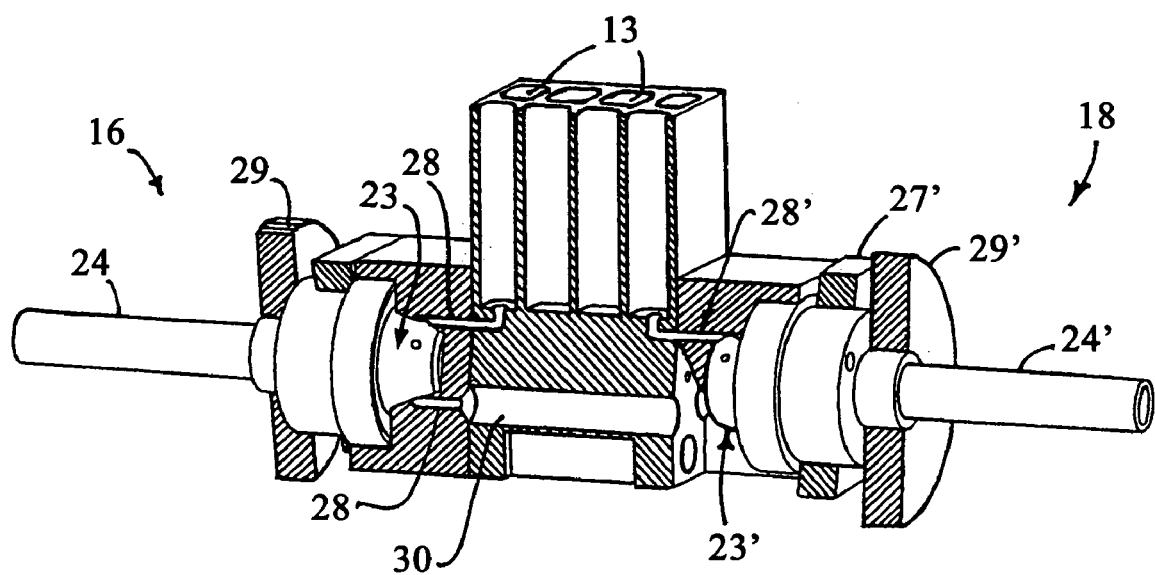
FIG. 2 is a sectional perspective view of the system of FIG. 1.
Figure 3:
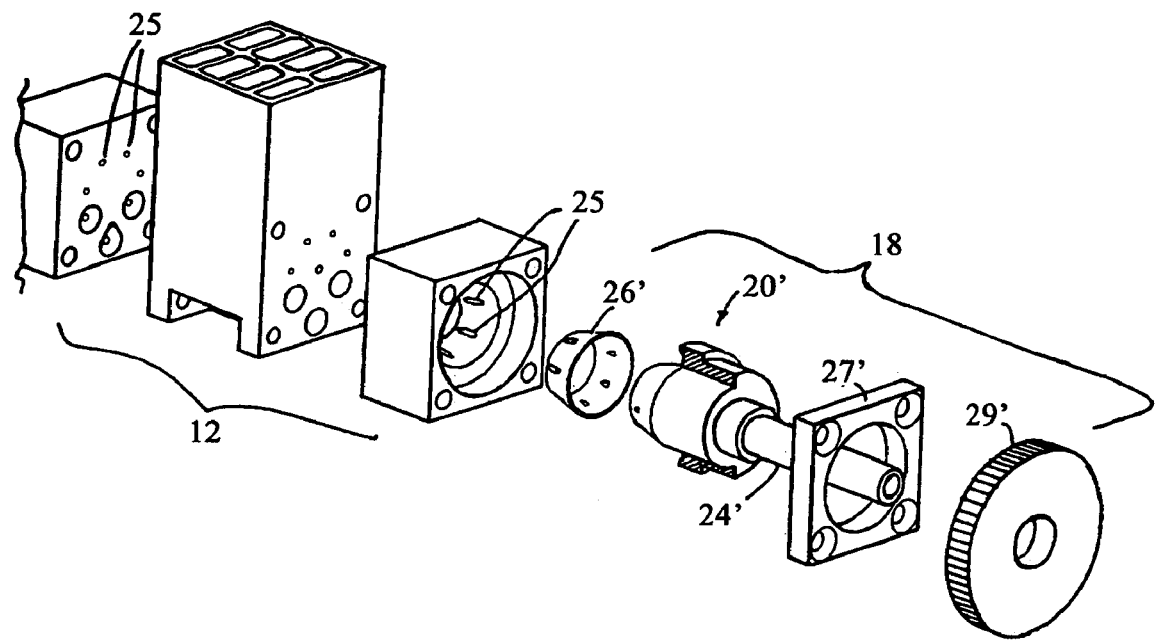
FIG. 3 is an exploded perspective view of a portion of the system of FIG. 1.
Figure 4:
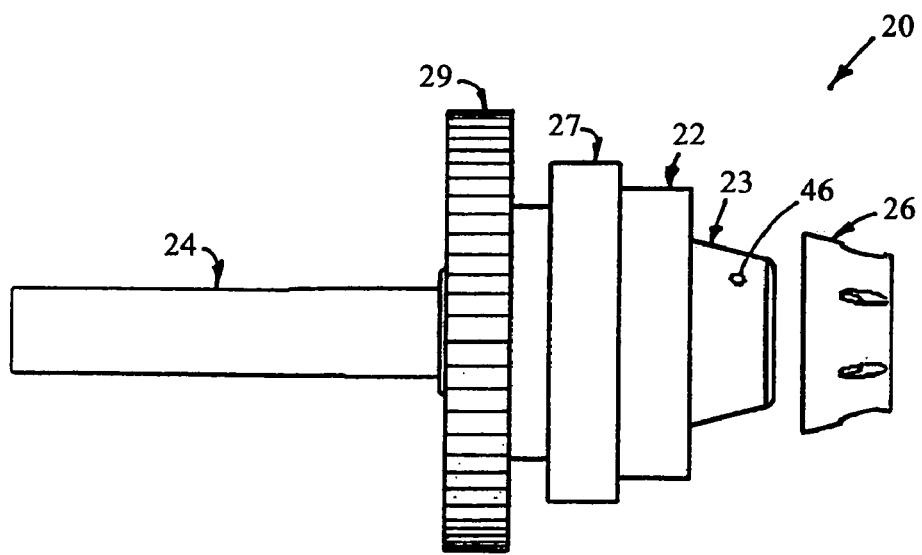
FIG. 4 is an elevational view of a valve in the system of FIG. 1.
Figure 5:
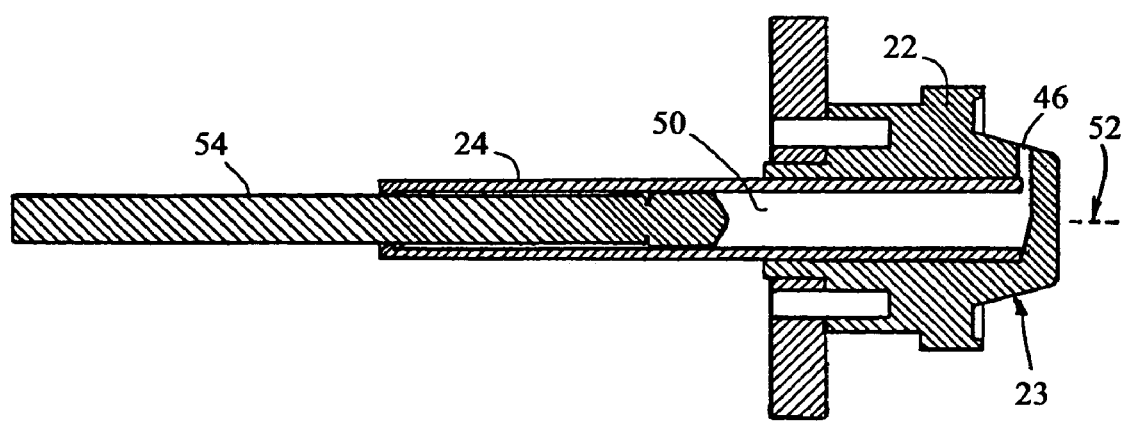
FIG. 5 is a cross-sectional view of the valve in the system of FIG. 4.
Figure 6:
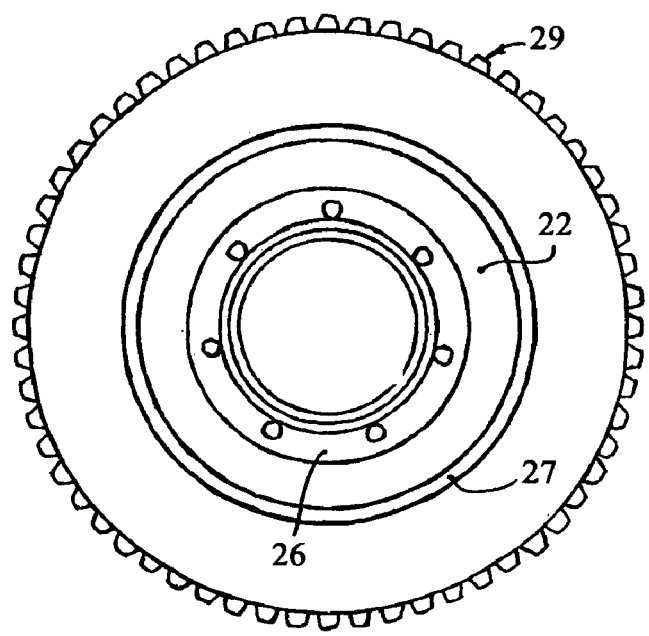
FIG. 6 is an end view of the valve of FIG. 4 from the right side.
Figure 7:
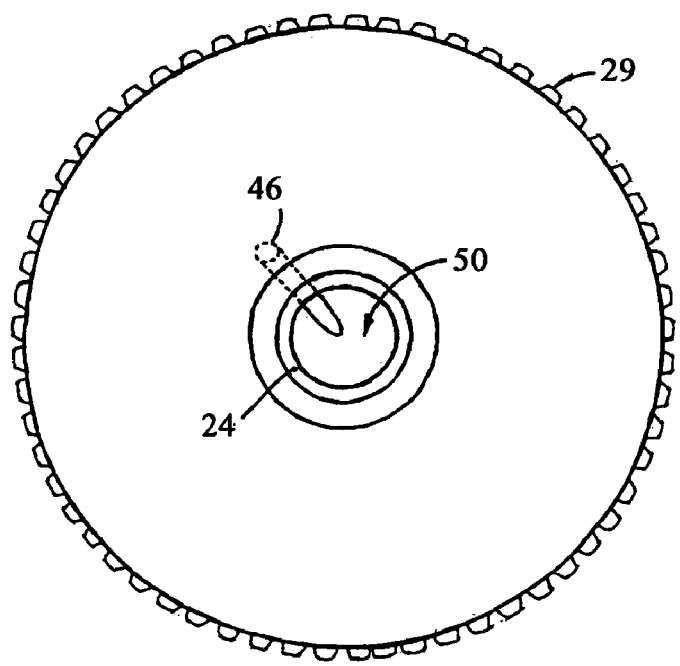
FIG. 7 is an end view of the valve of FIG. 4 from the left side.

FIGS. 1–3 show a fluid control and processing system 10 including a housing 12 having a plurality of chambers 13. FIG. 1 shows the chambers 13 exposed for illustrative purposes. A top cover will typically be provided to enclose the chambers 13. A pair of fluid control devices 16, 18 are connected to opposite sides of the housing 12. Each fluid control device in the embodiment shown is a rotary fluid control valve. The left valve 16 and the right valve 18 are identical in the exemplary embodiment, although they may have different sizes, shapes, or configurations in other embodiments. The same reference characters are used for the same components of the valves 16, 18, but a prime is added to the components of the valve 18. As best seen in FIG. 4, the valves each include a valve body 20 having a coupling portion 22 and a tubular portion 24. The coupling portion 22 has a generally conical external port surface 23. The valves 16, 18 are separately rotatable relative to the housing 12. As shown in FIG. 3, the housing 12 includes a plurality of housing ports 25 facing the external port surface 23 of the coupling portion 22 of the valves 16, 18 on opposite sides of the housing 12 to permit fluidic communication between the chambers 13 (as well as a fluid processing region(s) 30 as discussed below) and the valve 18 on opposite side of the housing 12. An optional seal or gasket 26, 26' is disposed between each coupling portion 22, 22' and the housing 12. Each valve assembly 16, 18 further includes an attachment member 27, 27' for attaching the valve to the housing 12, and a toothed rotary ring 29, 29'. In other embodiments, the external port surface may be planar or have other shapes, such as those shown in U.S. Pat. No. 6,374,684.

As best seen in FIG. 2, the housing 12 includes fluid lines 28 between the housing ports 25 and the chambers 13 as well as one or more fluid processing regions 30. In the exemplary embodiment, the fluid processing region 30 is disposed in the housing 12, although the fluid processing region 30 may be provided in a separate structure in alternate embodiments. Each valve 16, 18 may be configured to access some or all of the chambers 13 and fluid processing region(s) 30. As used herein, the term "fluid processing region" refers to a region in which a fluid is subject to processing including, without limitation, chemical, optical, electrical, mechanical, thermal, or acoustical processing. For example, chemical processing may include a catalyst; optical processing may include U.V. activation; electrical processing may include electroporation or electrophoresis or isoelectric focusing; mechanical processing may include mixing, filtering, pressurization, and cell disruption; thermal processing may include heating or cooling; and acoustical processing may include the use of ultrasound. The fluid processing region may include an active member, such as a filter, to facilitate processing of the fluid. Examples of active members include a micro fluidic chip, a solid phase material, a filter or a filter stack, an affinity matrix, a magnetic separation matrix, a size exclusion column, a capillary tube, or the like. Suitable solid phase materials include, without limitation, beads, fibers, membranes, filter paper, lysis paper impregnated with a lysing agent, glass wool, polymers, or gels. In a specific embodiment, the fluid processing region is used to prepare a sample for further processing, for instance, in a separate reaction vessel.

As shown in FIGS. 4–7, the coupling portion 22 of the valve body 20 has an external coupling port 46 on the generally conical external port surface 23. The external coupling port 46 is fluidically coupled with a fluid displacement region 50 disposed along the tubular portion 24 and extending into the coupling portion 22 of the valve body 20. In a preferred embodiment, the fluid displacement region 50 is a pumping channel or chamber. A fluid displacement member in the form of a plunger or piston 54 is movably disposed in the pumping chamber 50. When the piston 54 moves outward, it expands the volume of the pumping chamber 50 to produce a suction for drawing fluid into the pumping chamber 50. When the piston 54 moves inward, it decreases the volume of the pumping chamber 50 to drive fluid out of the chamber 50. Alternatively, for example, pressurization and depressurization of the displacement region 50 may be carried out using a diaphragm, an external pneumatic or pressure control system, or the like.

As the rotary valve body 20 is rotated around its axis 52 relative to the housing 12 of FIGS. 1–3, the external port 46 may be open and fluidically coupled with one of the chambers 13 or the fluid processing region 30, or the external port 46 may be blocked or closed. In this embodiment, the coupling portion 22 has only one external port 46. Additional external ports may be provided in other embodiments. Thus, each valve 16, 18 is rotatable with respect to the housing 12 to allow the external port 46 to be placed selectively in fluidic communication with a plurality of chambers 13 and the fluid processing region 30. Depending on which valve 16, 18 has an external port 46, 46' that is opened or closed and whether the piston 54 in that valve is moved outward or inward, the fluid flow in the valves 16, 18 can change directions, the external port 46, 46' in the valves 16, 18 can switch from being an inlet port to an outlet port, and the fluid flow may pass through the processing region 30 or bypass the processing region 30.

Figure 8:
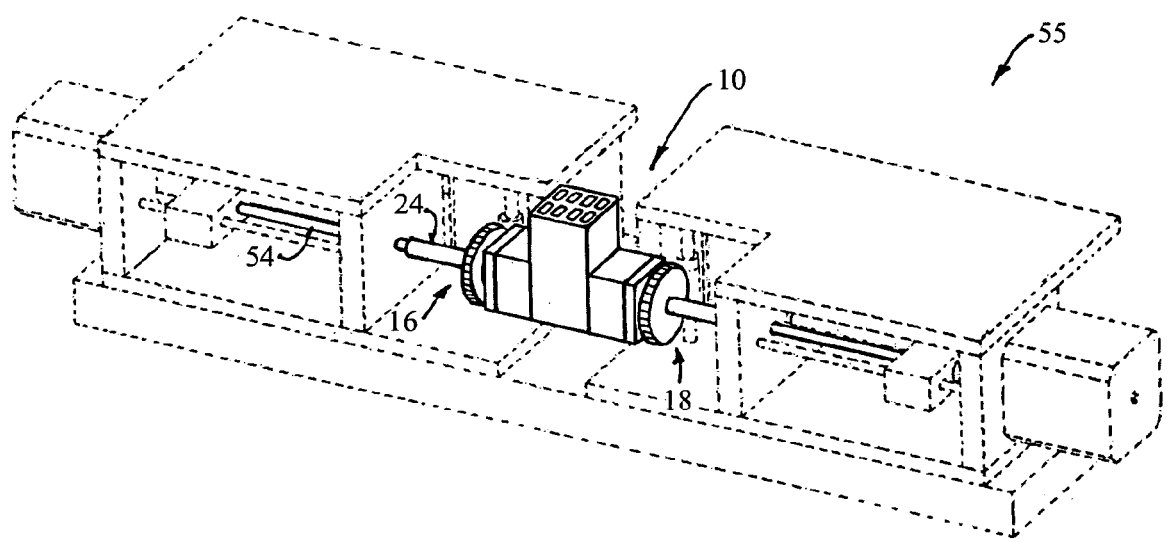
FIG. 8 is a perspective view of a drive mechanism for a fluid control and processing system according to an embodiment of the present invention.

FIG. 8 shows a drive mechanism 55 for actuating the plungers 54 of the two valves 16, 18 to manipulate fluid flow in the fluid displacement regions 50, chambers 13, and fluid processing region 30 in the fluid control and processing system 10. The movement of the plungers 54 may be controlled by stepper motors or the like. A motor is typically coupled to the toothed periphery 29 of the coupling portion 22 to rotate the valve 16 or 18 relative to the housing 12 for distributing fluid with high precision. The motor can be computer-controlled according to the desired protocol. A linear motor or the like is typically used to drive the piston 54 of the valve 16 or 18 up and down with precision to provide accurate metering, and may also be computer-controlled according to the desired protocol.

Figure 9:
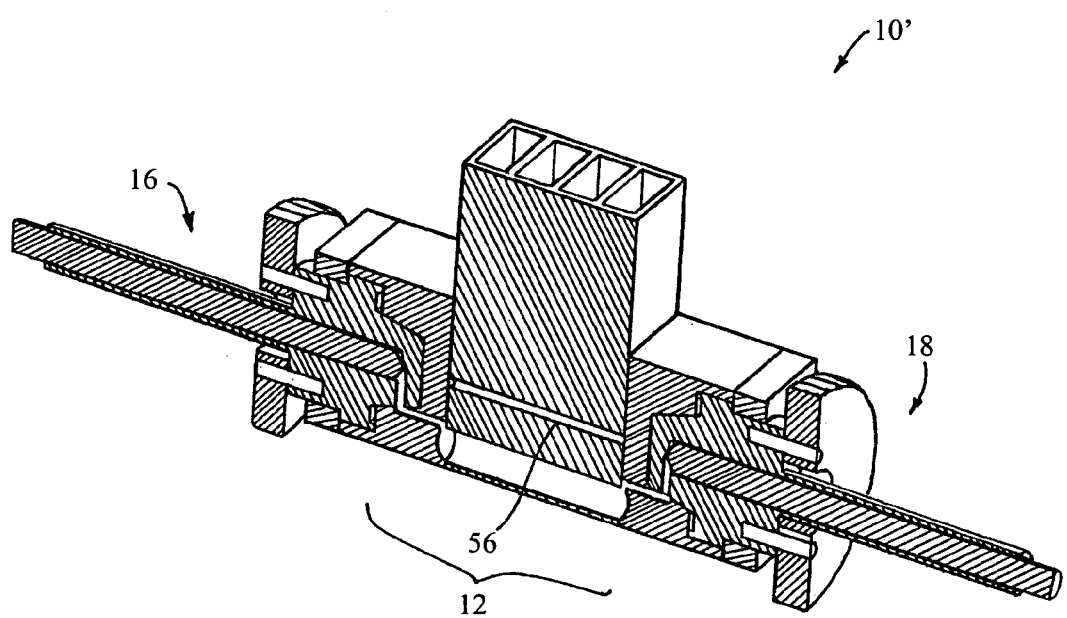
FIG. 9 is a sectional perspective view of a fluid control and processing system having a center channel according to another embodiment of the present invention.

In FIG. 9, the fluid control and processing system 10' is substantially identical to the system 10 of FIGS. 1–3, with an additional center channel 56 extending through the middle of the housing 12. This center channel 56 is normally closed, but may be opened to allow direct fluid flow between the fluid displacement regions 50 of the two valves 16, 18. Fluid can pass between the two valves 16, 18 without going through the fluid processing region 30 or the chambers 13. A toggling action may be produced by synchronously moving the plungers 54 of the valves 16, 18 back and forth through the center channel 56. In an alternative embodiment, the channel may be provided off-axis between the external ports 46 of the valves 16, 18. In addition, the center channel 56 may be replaced by a center fluid processing region fluidicly coupled to the valves via center ports, while the side ports are used to connect to the chambers. As demonstrated by the various embodiments, a variety of configurations of flow paths and processing regions for manipulating fluid are possible by coupling a plurality of valves to a common body.

Figure 10:
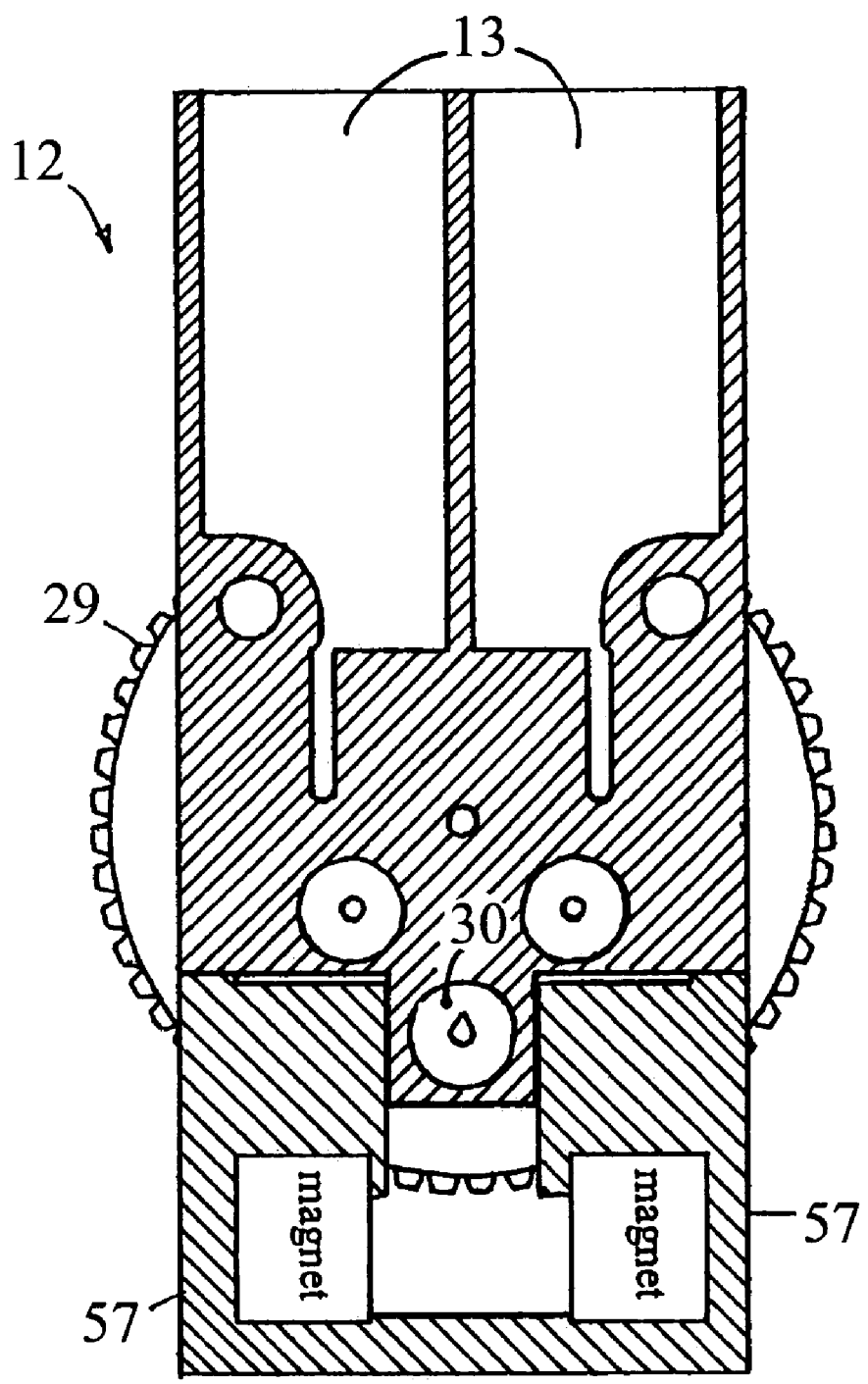
FIG. 10 is a sectional view showing a magnetic separation device for the fluid processing region in the system of FIG. 1.

As discussed above, the fluid processing region 30 may include a variety of elements for performing different processes on the fluid passing therethrough. FIG. 10 shows an example of a magnetic separation device including magnets 57 disposed adjacent the fluid processing region 30 for performing magnetic separation on the fluid passing therethrough.

Figure 11A:
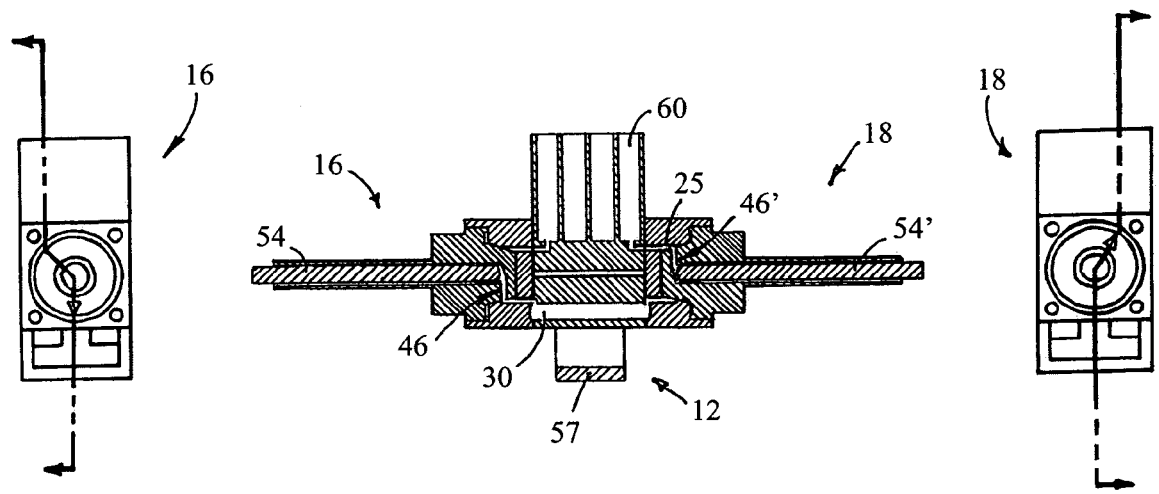
FIGS. 11A–11S are schematic sectional views illustrating a specific protocol for controlling and processing fluid using the fluid control and processing system of FIG. 1.
Figure 11B:
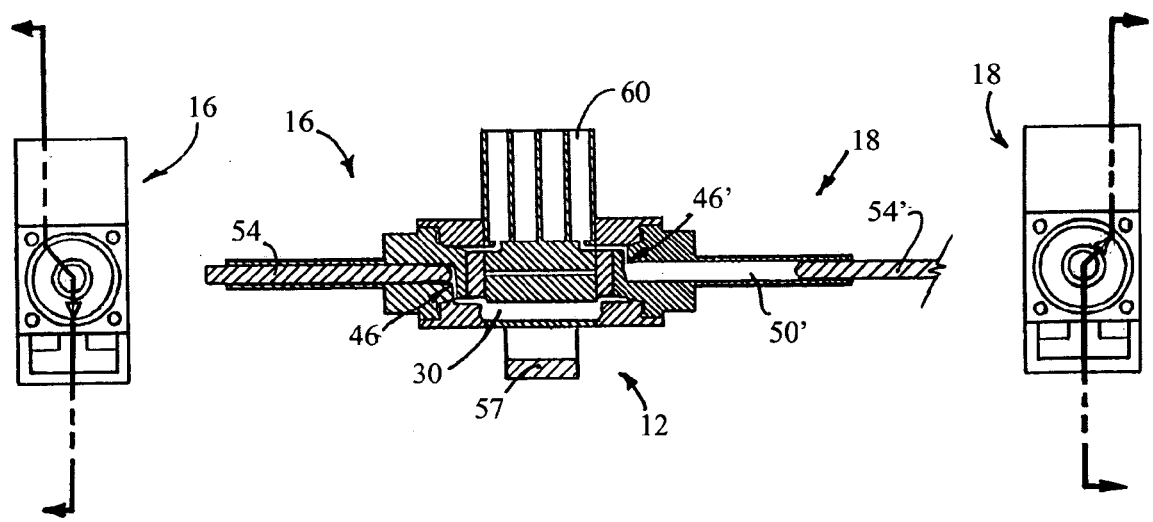
Figure 11C:
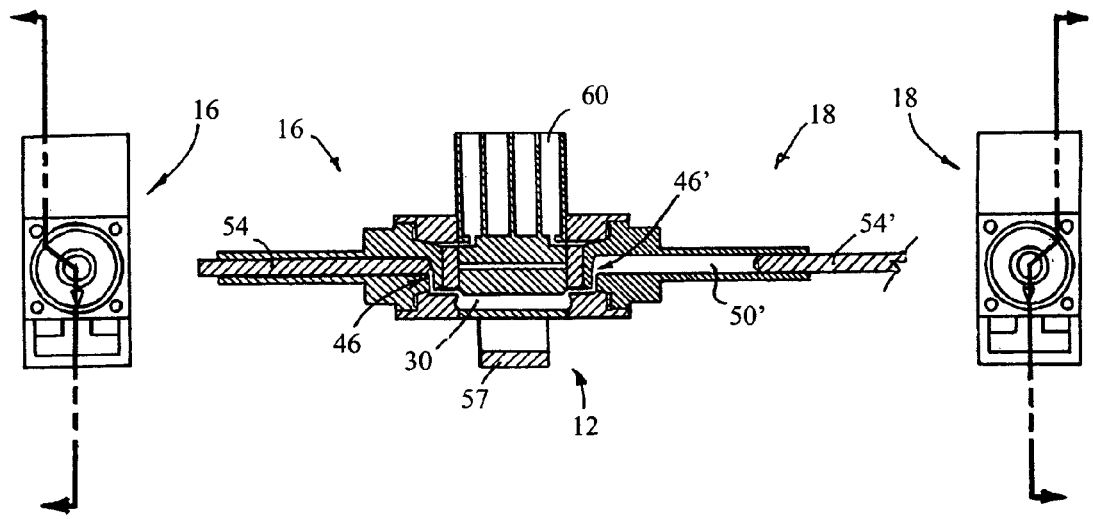
Figure 11D:
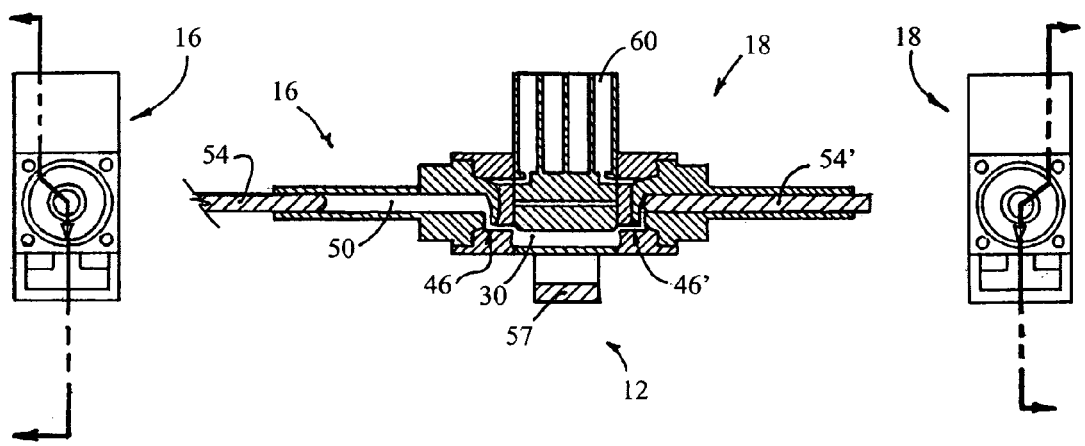
Figure 11E:
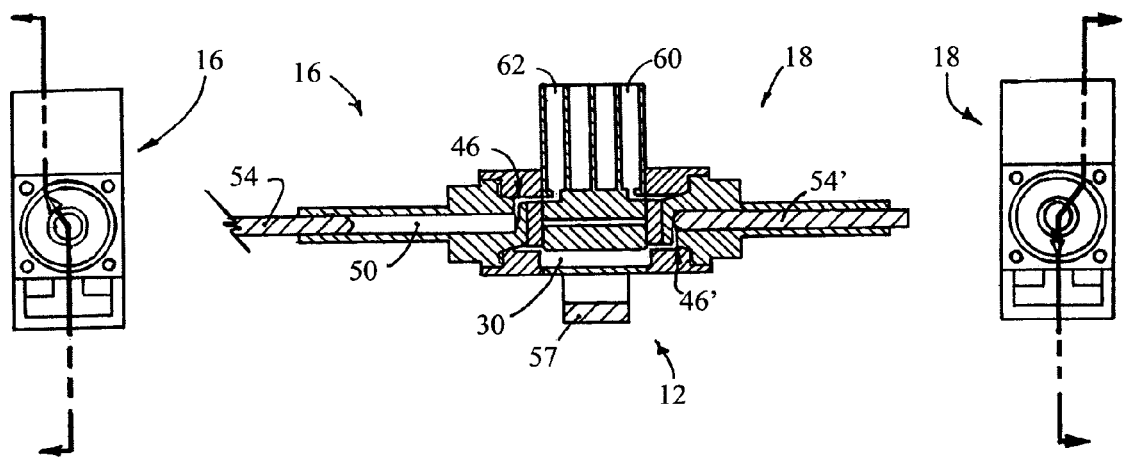
Figure 11F:
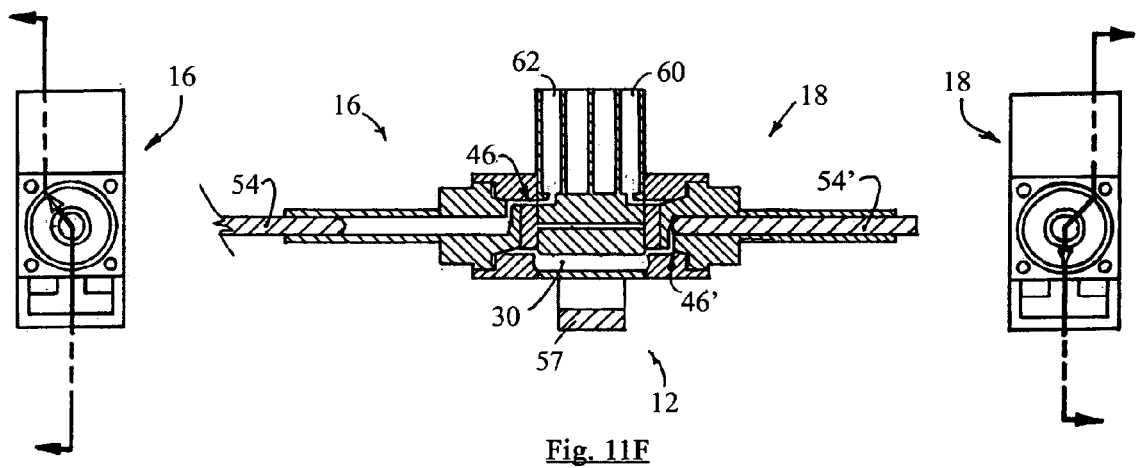
Figure 11G:
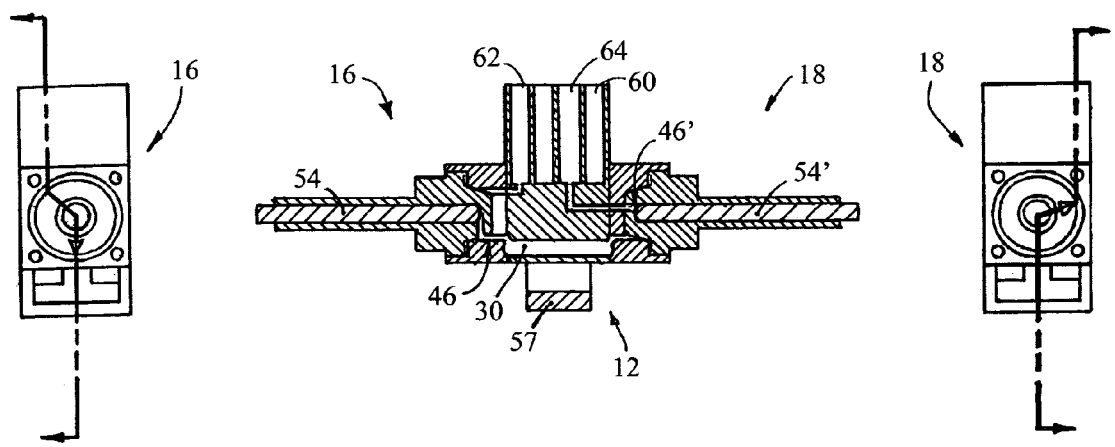
Figure 11H:
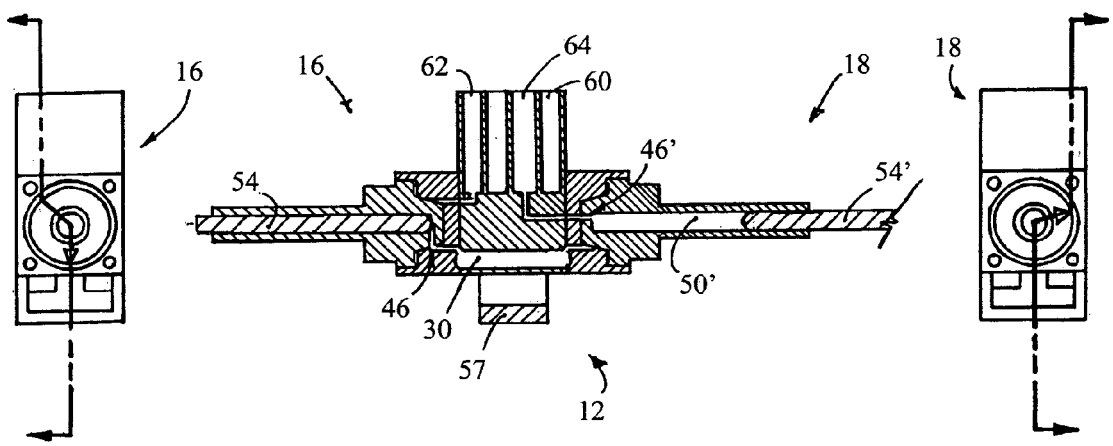
Figure 11I:
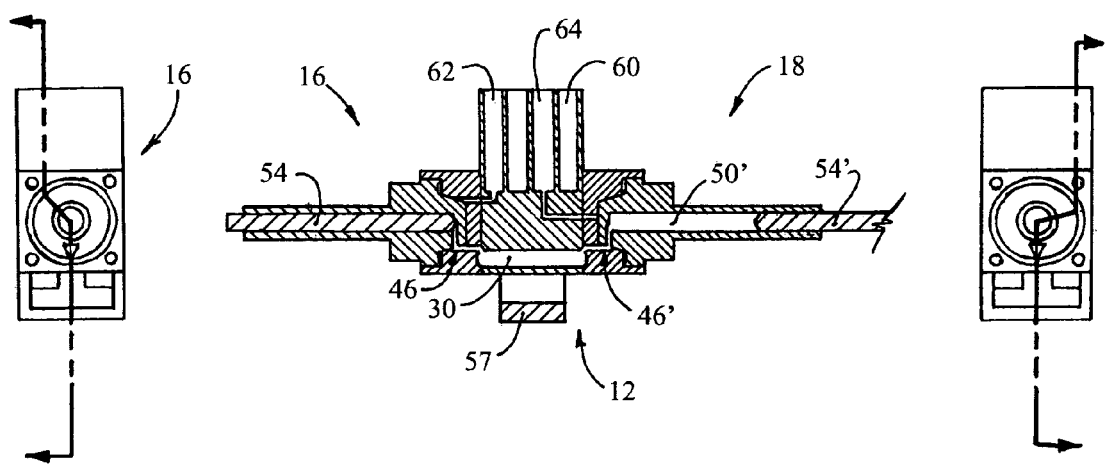
Figure 11J:
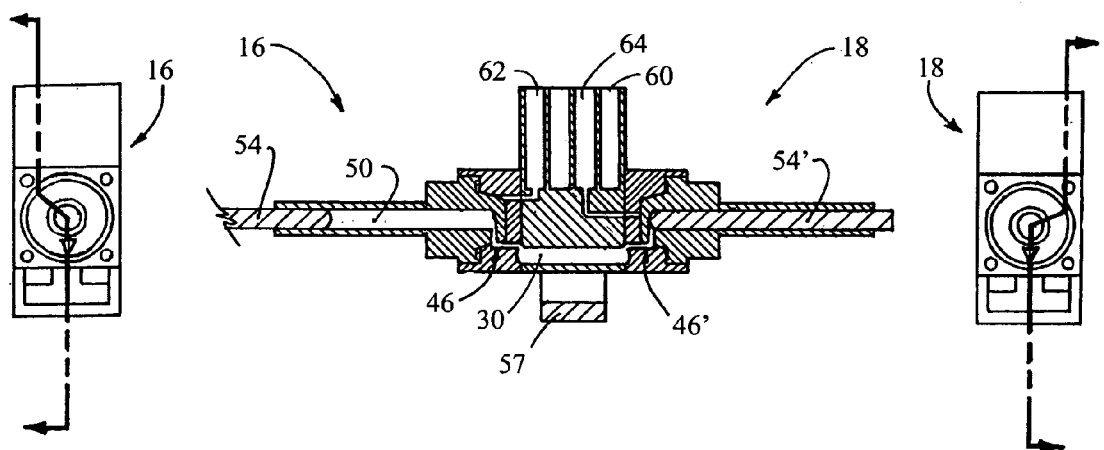
Figure 11K:
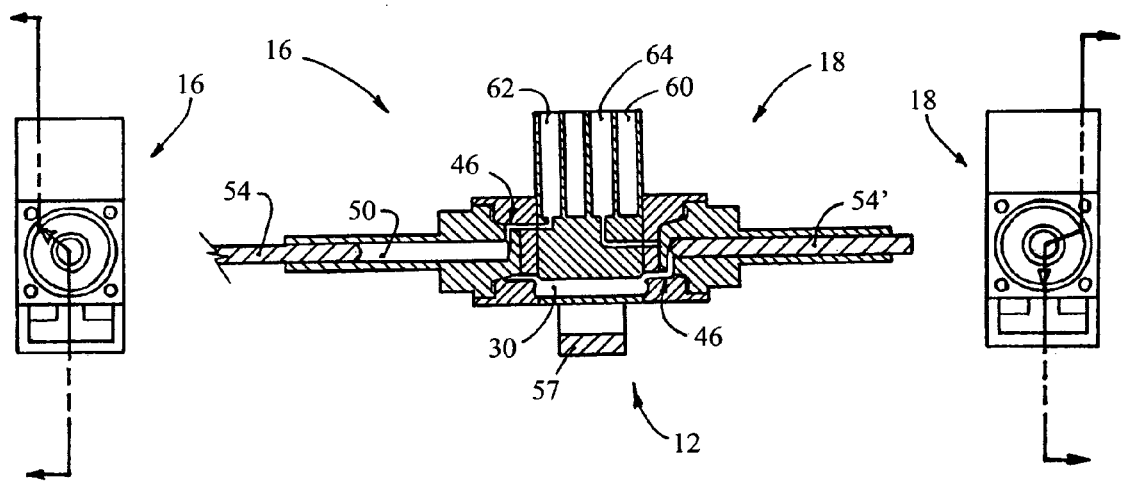
Figure 11L:
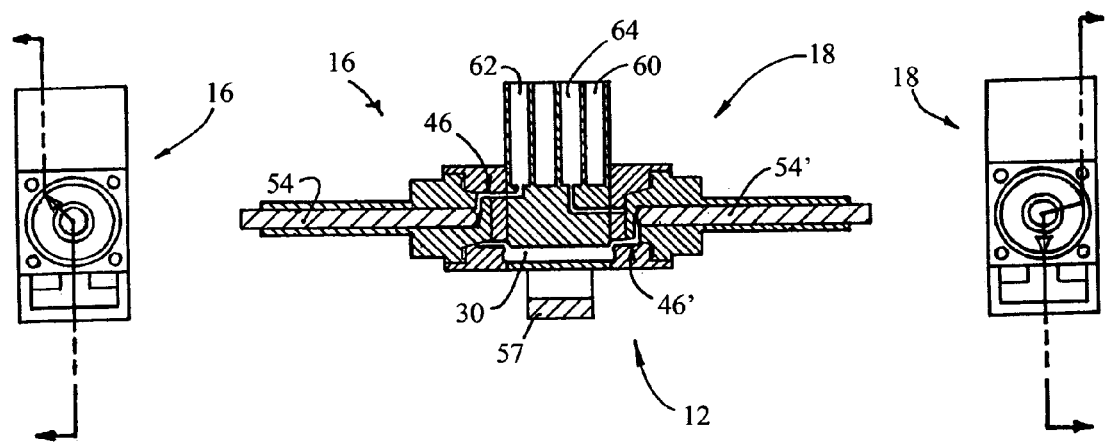
Figure 11M:
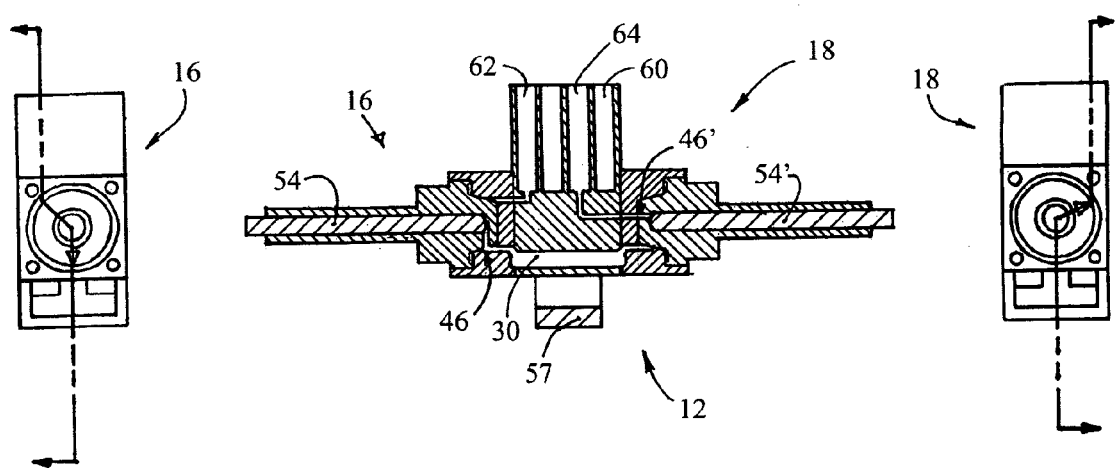
Figure 11N:
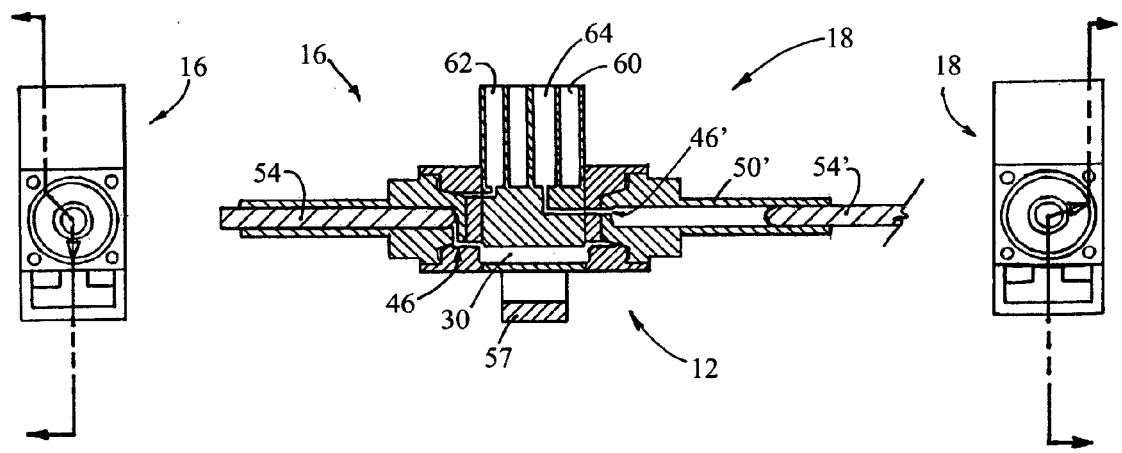
Figure 11:
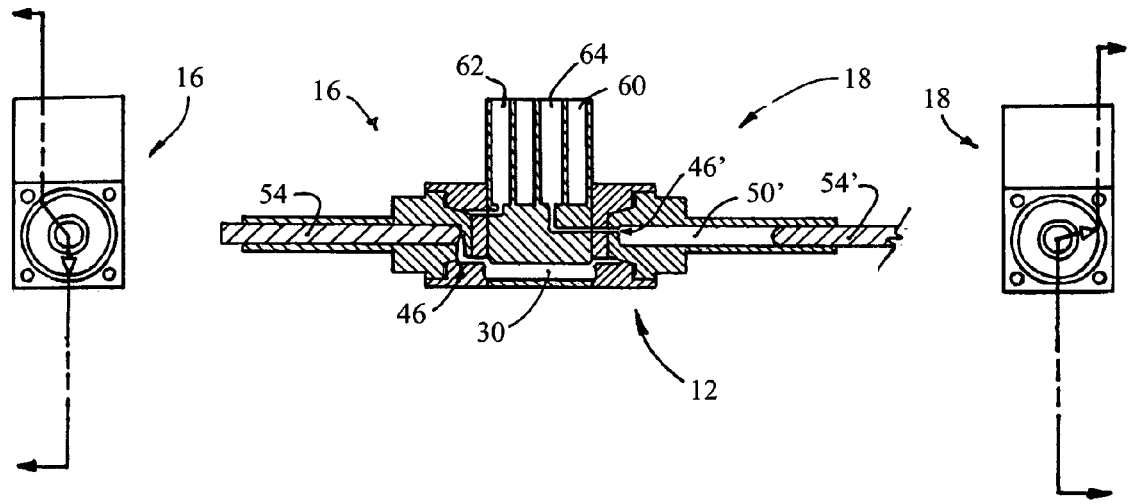
Figure 11P:
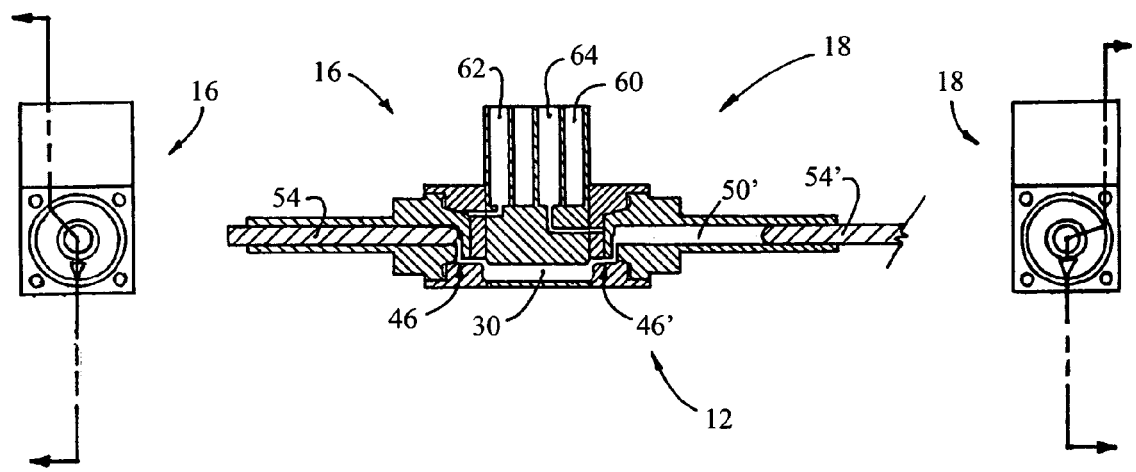
Figure 11Q:
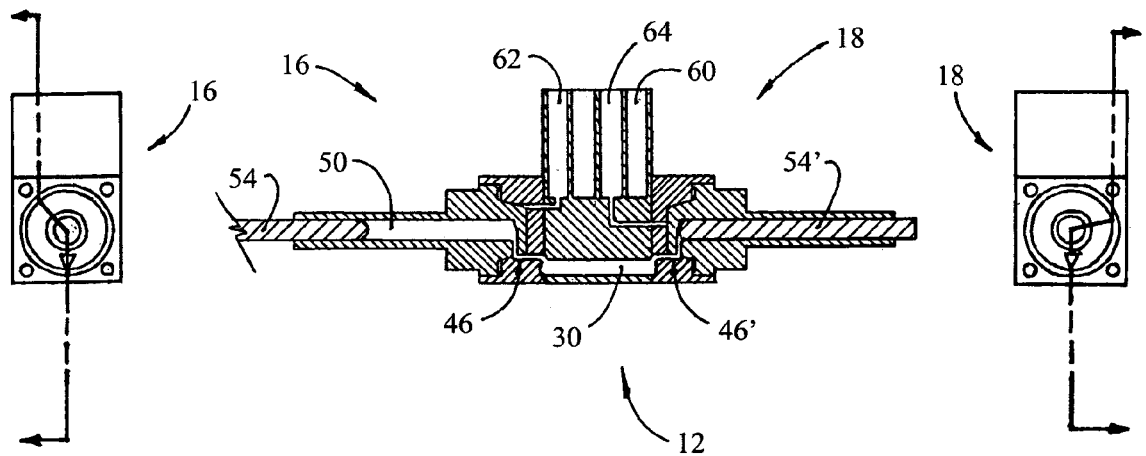
Figure 11R:
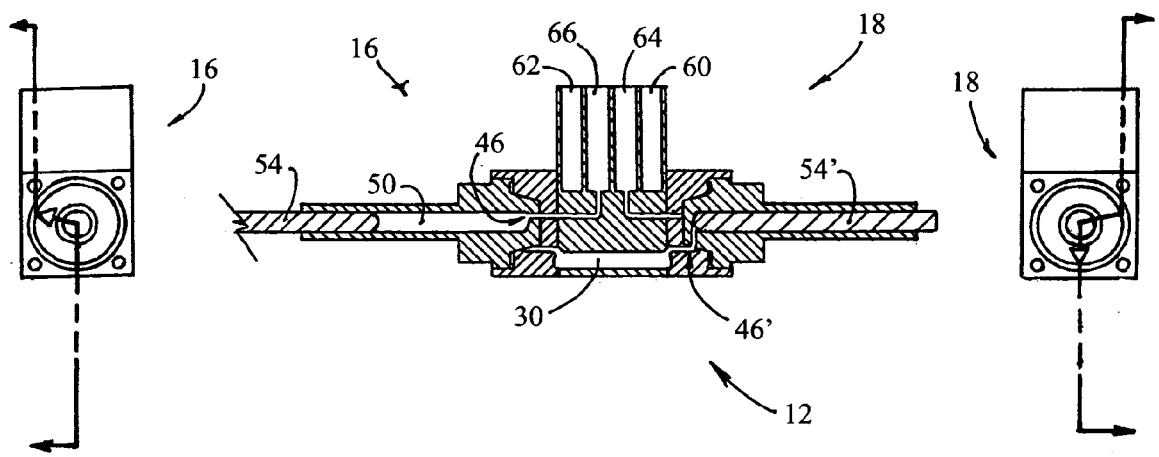
Figure 11S:
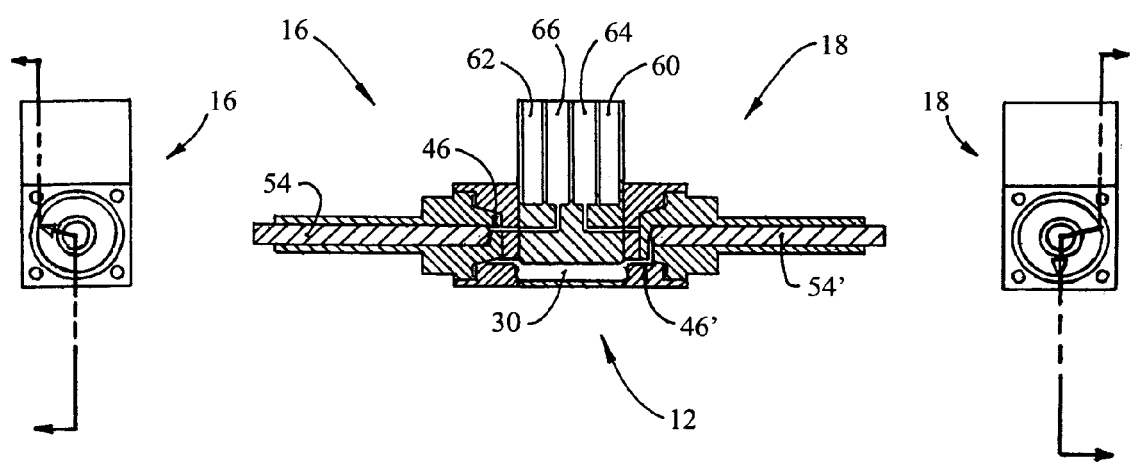

To demonstrate the fluid metering and distribution function of the valves 16, 18, FIGS. 11A–11S illustrate the operation of the valves 16, 18 for a specific protocol involving magnetic separation. Each figure shows the rotary position of the rotary valves 16, 18, and a cross-sectional view of the valves 16, 18 and the housing 12 along the double arrows. The protocol will aspirate a sample from a sample chamber containing a target that has been tagged with iron particles. The sample will pass through the fluid processing region in the form of a magnetic separation column which is subjected to a strong magnetic field. The waste will be transferred to a waste chamber. The separation column will then be washed by a wash solution from a wash chamber. The magnetic field will be removed. The target will then be eluted from the separation column with a wash buffer, and transferred to a target chamber.

In FIG. 11A, the external port 46' of the right valve 18 is placed in fluidic communication with the port 25 for a sample chamber 60, while the external port 46 of the left valve 16 is either blocked or placed in fluidic communication with the fluid process region 30. In FIG. 11B, the piston 54' of the right valve 18 is pulled outward to draw a fluid sample from the sample chamber 60 through the external port 46' into the fluid displacement region 50'. In FIG. 11C, the right valve 18 is rotated from the sample chamber position to the processing region position to place the fluid displacement region 50' in fluidic communication with the fluid processing region 30. The left valve 16 is also in fluidic communication with the fluid processing region 30, which is a magnetic separation column such as that illustrated in FIG. 10. In FIG. 11D, the fluid sample in the fluid displacement region 50' of the right valve 18 is transferred through the processing region 30 to the fluid displacement region 50 of the left valve 16. This is accomplished by pushing the piston 54' of the right valve 18 inward and pulling the piston 54 of the left valve 16 outward. The target material is captured in the magnetic separation column 30.

In FIG. 11E, the left valve 16 is rotated from the processing region position to the waste chamber position to place the fluid displacement region 50 in fluidic communication with a waste chamber 62. In FIG. 11F, the piston 54 of the left valve 16 is pushed inward to drive the fluid to the waste chamber 62. In FIG. 11G, the left valve 16 is rotated back to the processing region 30 position to place the fluid displacement region 50 in fluidic communication with the processing region 30. The right valve 18 is rotated to a wash chamber position to place the fluid displacement region 50' in fluidic communication with a wash chamber 64. In FIG. 11H, the piston 54' is pulled outward the aspirate a wash fluid or buffer from the wash chamber 64 into the fluid displacement region 50'. In FIG. 11I, the right valve 18 is rotated from the wash chamber position to the processing region position to place the fluid displacement region 50' in fluidic communication with the fluid processing region 30. In FIG. 11J, the wash fluid is transferred from the right valve 18 through the processing region 30 to the left valve 16 by pushing the piston 54' of the right valve 18 inward and pulling the piston 54 of the left valve 16 outward. In FIG. 11K, the left valve 16 is rotated from the processing region position to the waste chamber position to place the fluid displacement region 50 in fluid communication with the waste chamber 62. In FIG. 11L, the piston 54 is pushed inward the pump the wash fluid from the fluid displacement region 50 of the left valve 16 to the waster chamber 62. The wash fluid removes unwanted fluid and/or residues from the fluid processing region 30.

In FIG. 11M, the left valve 16 is rotated to the fluid processing position to place the fluid displacement region 50 in fluidic communication with the processing region 30. The right valve 18 is rotated to the wash chamber position to place the fluid displacement region 50' in fluidic communication with the wash chamber 64. In FIG. 11N, the piston 54' is pulled outward to draw a wash buffer from the wash chamber 64 to the fluid displacement region 50' of the right valve 18. In FIG. 11O, the magnets 57 adjacent the fluid processing region 30 are removed. In FIG. 11P, the right valve 18 is rotated to the processing region position to place the fluid displacement region 50' in fluidic communication with the fluid processing region 30.

In FIG. 11Q, the wash buffer is transferred as an elution wash from the right valve 18 through the fluid processing region 30 to the left valve 16 to elute the target material in the fluid processing region 30. This is accomplished by pushing the piston 54' of the right valve 18 inward and pulling the piston 54 of the left valve 16 outward. In FIG. 11R, the left valve 16 is rotated to a target chamber position to place the fluid displacement region 50 in fluidic communication with a target chamber 66. In FIG. 11S, the piston 54 is pushed inward to pump the eluted target material to the target chamber 66.

As illustrated in the above embodiments, the fluid control and processing system is advantageously a fully contained system that is versatile and adaptable. The two fluid displacement regions are the motivating forces for moving fluid in the system. The two fluid displacement regions can be selectively placed in fluidic communication with the fluid processing region. Each fluid displacement region (motivating force) also acts as a temporary storage area for the fluid being driven through the system. The fluid can be toggled back and forth between the fluid displacement regions through a channel. The dual valve system has very little dead volume compared to a single valve system. This is particularly advantageous for isolation/enrichment of rare target sample or a protocol that only needs one fluid processing region. While the embodiments shown employ a moving piston in the fluid displacement region as the motivating force, other mechanisms may be used including, e.g., pneumatic pump mechanisms or the like which use pressure as the motivating force without a change in volume of the fluid displacement region. The left and right valves can address any of the chambers to permit random access to reagents and other fluids. Complex protocols can be programmed relatively easily into a computer controller and then executed using the versatile fluid control and processing system. A myriad of different protocols can be performed using a single platform.

In the embodiments shown, each valve includes one external port 46. Each external port 46 is placed selectively in fluidic communication with one of the chambers or the fluid processing region in an open position or be blocked in a closed position. In alternate embodiments, the valve may include additional external ports. Generally, the valve operates with only one external port in the open position and the remaining external port(s) in the closed position. The use of multiple external ports can reduce the amount of rotation required to place the valve in fluidic communication with the chambers and fluid processing region, thereby saving time in operation.

The use of a single valve type produces high manufacturing yields due to the presence of only one failure element. The concentration of the fluid control and processing components results in a compact apparatus (e.g., in the form of a small cartridge) and facilitates automated molding and assembly. As discussed above, the system advantageously includes dilution and mixing capability, intermediate wash capability, and positive pressurization capability. The fluid paths inside the system are normally closed to minimize contamination and facilitate containment and control of fluids within the system.

The components of the fluid control and processing system may be made of a variety of materials that are compatible with the fluids being used. Examples of suitable materials include polymeric materials such as polypropylene, polyethylene, polycarbonate, acrylic, or nylon. The various chambers, channels, ports, and the like in the system may have various shapes and sizes.

Figure 12:
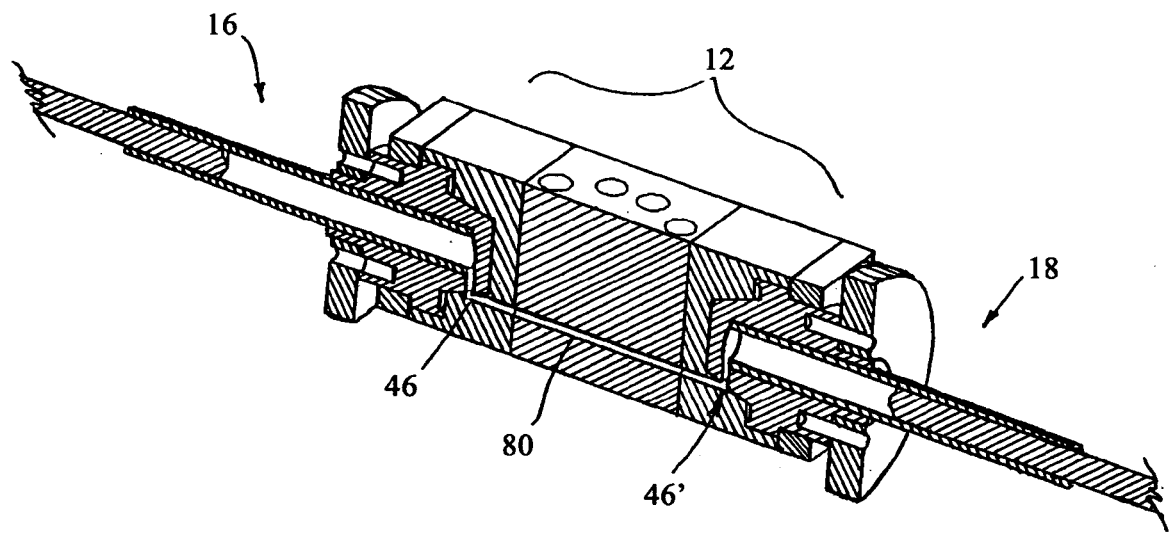
FIG. 12 is a sectional perspective view of a fluid control and processing system having a channel connection according to another embodiment of the present invention.

The above-described arrangements of apparatus and methods are merely illustrative of applications of the principles of this invention and many other embodiments and modifications may be made without departing from the spirit and scope of the invention as defined in the claims. For instance, the system may incorporate additional valves, a soft-walled chamber, a small piston for driving smaller amounts of fluid, a side chamber, a syringe or sipper or the like integrated into the device to provide a means for moving a sample directly into the housing, such as those disclosed in U.S. Pat. No. 6,374,684. FIG. 12 shows another embodiment having a channel 80 which is disposed to fluidicly communicate with the external ports 46, 46' of the two valves 16, 18. The channel 80 may be used to transfer fluid between the valves or for toggling between the valves. Although the chambers shown above are formed in a housing, alternate embodiments may provide tubes, bags, or the like instead to supply or receive fluid to the fluid control and processing system.

Figure 13:
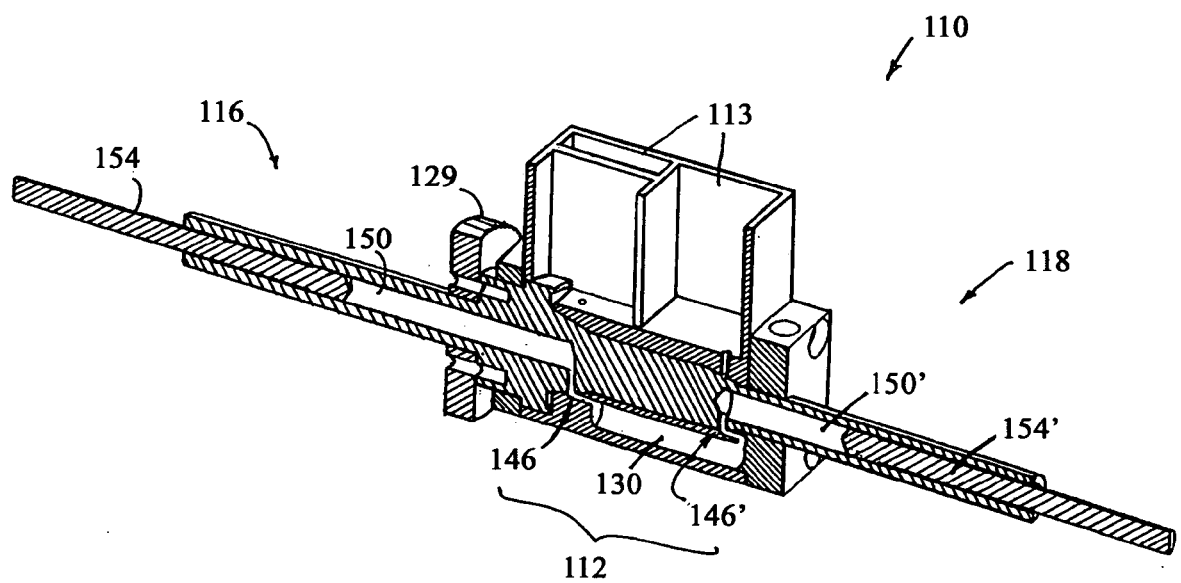
FIG. 13 is a sectional perspective view of a fluid control and processing system with single valve control according to another embodiment of the present invention.

FIG. 13 shows a fluid control and processing system 110 having a housing 112 with chambers 113, a left valve 116, a right valve 118, and a fluid processing region 130. The left valve 116 has a left external port 146, a left fluid displacement region 150, and a left piston 154. The right valve 1118 has a right external port 146', a right fluid displacement region 150', and a right piston 154'. The two pistons 154, 154' can move independently. In this embodiment, the two valves 116, 118 move together as a unit by a single rotary ring 129. The valves 116, 118 can be placed in fluidic communication with the fluid processing region 130 simultaneously via the external ports 146, 146', and may also be placed in fluidic communication with any one of the chambers simultaneously also via the external ports 146, 146'. This configuration allows addressing of any port by either valve in a closed system. Because the pistons 154, 154' can operate independently, a variety of fluid flow control movements are still possible. Thus, the system 110 operates with a lack of independence of valve rotations by taking advantage of having the external ports 146, 146' fluidicly coupled with exterior regions (chambers or processing regions with fluids, buffers, etc.) on common valve positions with each other, and using the pistons 154, 154' independently to address the fluids. To transfer a fluid through the fluid processing region 130 from one valve to the other valve, the pistons 154, 154' are controlled to move synchronously. This single valve control system 110 has fewer parts and can be produced more economically.

Figure 14:
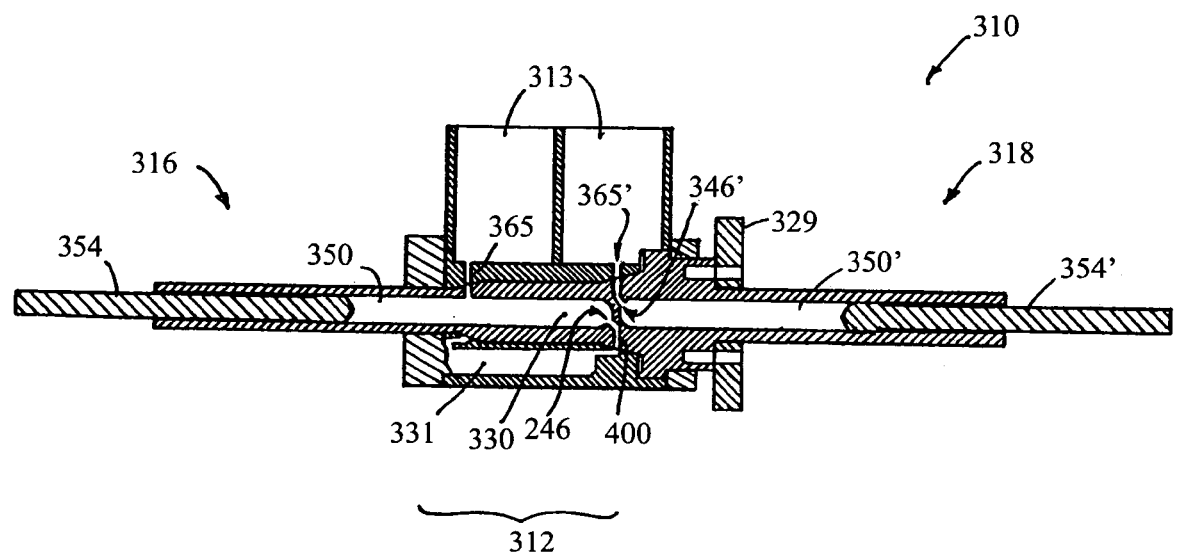
FIG. 14 is a sectional view of a fluid control and processing system with out-of-phase valves according to one embodiment.

FIG. 14 shows the use of out-of-phase channels for a single valve fluid processing and control system 310 that is similar to the system 110 of FIG. 13. The system 310 includes a housing 312, a left valve 316, and a right valve 318. The fluid processing region 330 is open to the central fluid displacement region 350 of the left valve 316, but not to the fluid displacement region 350' of the right valve 318. Thus, the fluid displacement region 350' of the right valve 318 has access only to the chambers 313 and the satellite fluid processing region(s) 331. The left valve 316 has a left external port 346 a left piston 354, and the right valve 318 has aright external port 346' and aright piston 354'. The left external port 346 is disposed 180 degrees from the right external port 346'. The two pistons 354, 354' can move independently. In this embodiment, the two valves 316, 318 move together as a unit by a single rotary ring 329. The satellite chambers and fluid processing regions 313, 331 are arranged with the ports in phase with each other, so that when these ports are addressed by the "regular" valve ports 365, 365', fluid flow can occur by simple synchronous pumping of the pistons 354, 354'. When the additional right hand port 400 is aligned with a chamber, then the left hand piston 354 can pump directly through the central processing region 330 into an opposite side chamber 313'. This hybrid allows a very efficient arrangement to occur, since the left hand side valve 365 can address a sample chamber, aspirate, and then rotate the valve to align the additional left side valve port 400 to a waste chamber, and then pump directly through the central processing region 330 into the waste chamber, without any movement of the right hand piston 354'. In this way, the bulk of the sample can be processed very quickly and efficiently. After the bulk sample has been processed, subsequent processing steps can use the more typical synchronous piston movements and "regular" valve ports 365, 365' to further manipulate the sample in the satellite fluid processing region(s) 331 (in the same manner as shown in FIG. 13).

Figure 15:
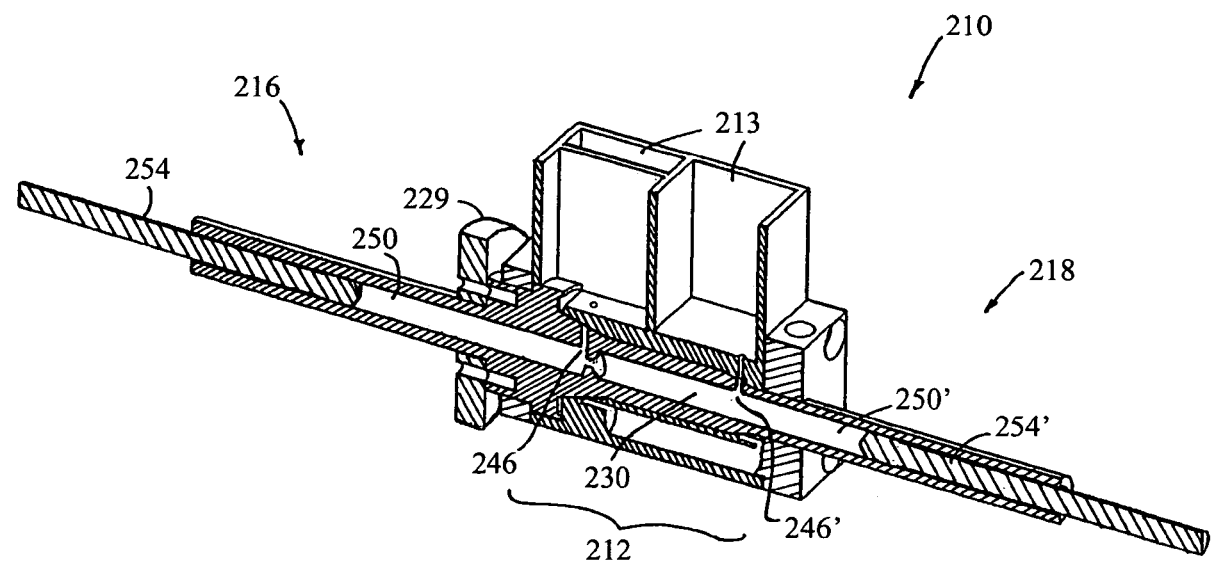
FIG. 15 is a sectional perspective view of a fluid control and processing system with single valve control according to another embodiment of the present invention.

FIG. 15 shows a fluid control and processing system 210 that is similar to the system 110 of FIG. 13. The system 210 includes a housing 212 with chambers 213, a left valve 216, and a right valve 218. The fluid processing region 230, however, is disposed between and open to the fluid displacement region 250 of the left valve 216 and the fluid displacement region 250' of the right valve 218. The left valve 216 has a left external port 246, a left piston 254, and the right valve 218 has a right external port 246' and a right piston 254'. The two pistons 254, 254' can move independently. In this embodiment, the two valves 216, 218 move together as a unit by a single rotary ring 229. The valves 216, 218 can be placed in fluidic communication with any one of the chambers 213 simultaneously via the external ports 246, 246'. This configuration allows addressing of any port by either valve in a closed system. Because the pistons 254, 254' can operate independently, a variety of fluid flow control movements are still possible. All synchronous movement of the pistons 254, 254' pumps fluid through the fluid processing region 230. Pumping is denied through the fluid processing region 230 if one of the pistons is left stalled up against the boundary of the fluid processing region 230.

The system 210 of FIG. 15 has a central fluid processing region 230. In order to prevent fluid flow through the central region 230 when aspirating or dispensing from the chambers on one side, the piston on the other side must rest against the fluid processing boundary. If the piston is not resting against the fluid processing boundary, it is possible that fluid can be inadvertently drawn through the port on the opposite side of the moving piston. This problem is avoided if the ports on either side of the body 212 are situated out of phase with each other since pumping through the fluid processing region 230 is denied when either of the two pistons 254, 254' is not moving. For instance, five ports on one side are disposed at 0, 72, 144, 216, and 288 degrees and five ports on the other side are disposed at 36, 108, 180, 252, and 324 degrees, measured from a common reference direction. Even if the piston is not pressed up against the interface, fluid will not flow through the central fluid processing region 230 since the opposite side will not be aligned with a port. Moreover, if the valves 216, 218 are disposed such that the opposite side or far side valve (e.g., 216) is aligned with a port 246 and the near side valve 218 is closed off from the valve 246', then fluid can be pumped from the near side valve 218 directly through the central processing region 230 and through the aligned port 246 into a chamber on the far side, without having the far side piston 254 do anything. Thus, fluid can be moved through the fluid processing region 230 without synchronous movement of the pistons 254, 254' of the two valves 216, 218. This version of the single valve control system 210 also has fewer parts and can be produced more economically.

Figure 16:
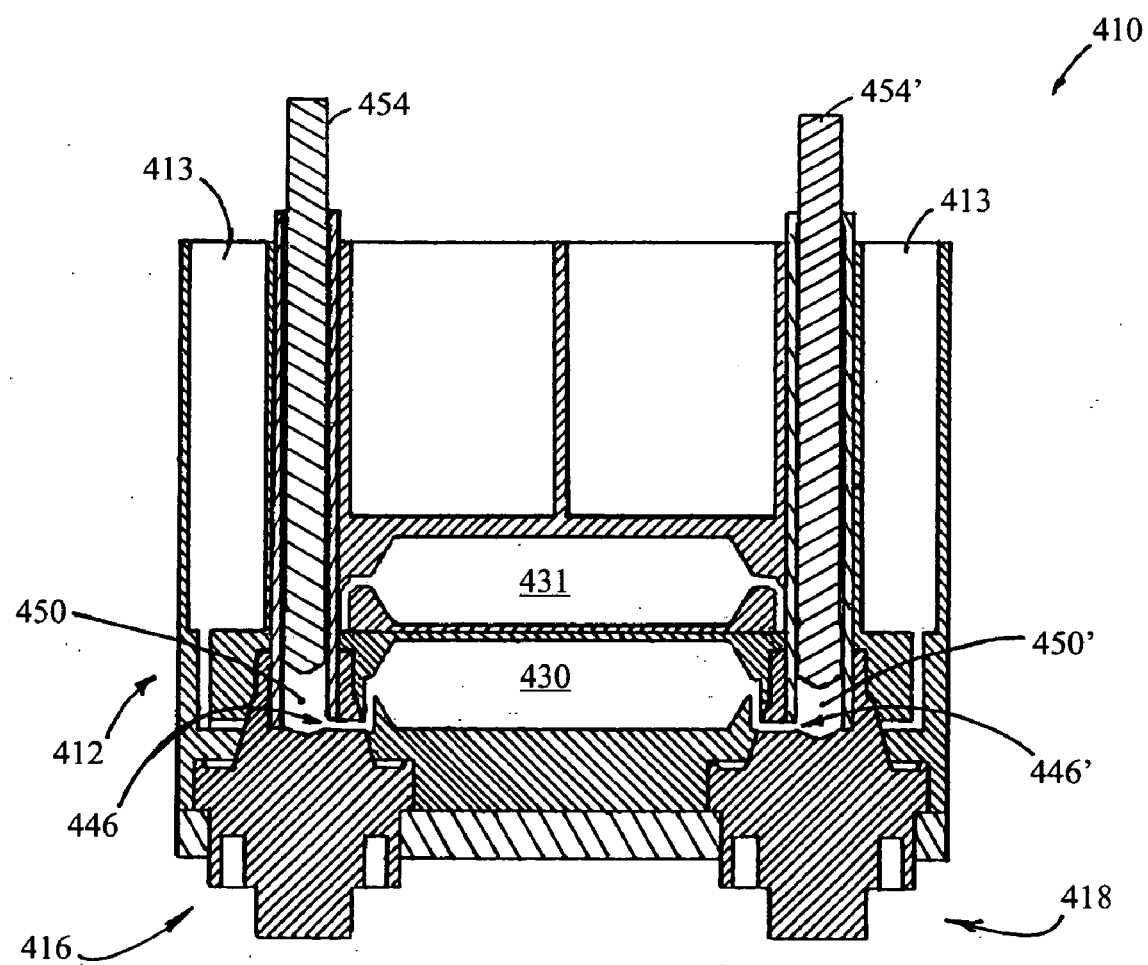
FIG. 16 is a sectional view of a fluid control and processing system employing a parallel configuration according to another embodiment of the present invention.

FIG. 16 shows a fluid control and processing system 410 having a parallel or U-shaped configuration instead of the serial configuration in FIG. 1. The system 410 includes a housing 412 having a plurality of chambers 413, a left valve 416, and a right valve 418. The left valve 416 has a left external port 446 a left piston 454, and the right valve 418 has a right external port 446' and a right piston 454'. The two pistons 454, 454' can move independently, and the two rotary valves 416, 418 can rotate independently to be placed in fluidic communication with any of the chambers 413 or the fluid processing regions 430, 431. This configuration allows the motors for rotating the rotary valves 416, 418 and driving the pistons 454, 454' to be disposed on one side, which may be more convenient and produce a more compact system.

The scope of the invention should, therefore, be determined not with reference to the above description, but instead should be determined with reference to the appended claims along with their full scope of equivalents.

What is claimed is:

1. A fluid control and processing system comprising:
   a plurality of chambers;
   a body including a fluid sample processing region; and
   a plurality of valves, each valve including a valve body having a fluid displacement region which is depressurizable to draw fluid into the fluid displacement region and pressurizable to expel fluid from the fluid displacement region, the valve body including an external port, the fluid displacement region being fluidicly coupled with the external port of the valve body, the valve body being adjustable with respect to the fluid sample processing region to place the external port selectively in fluidic communication with the fluid sample processing region, and the valve body being adjustable with respect to the plurality of chambers to allow the external port to be placed selectively in fluidic communication with the plurality of chambers.

2. The system of claim 1 wherein the valve bodies of the valves are separately adjustable to place the external ports of the valve bodies selectively in fluidic communication with the fluid sample processing region or with the chambers.

3. The system of claim 1 further comprising a channel having two ends and disposed between the valve bodies of two valves, wherein the valve bodies of the two valves are adjustable with respect to the channel to place the two fluid displacement regions of the two valve bodies selectively in fluidic communication with the two ends of the channel.

4. The system of claim 3 wherein pressurization and depressurization of the fluid displacement region of one of the two valve bodies is synchronized, respectively, with depressurization and pressurization of the fluid displacement region of the other of the two valve bodies to move a fluid back or forth between the two fluid displacement regions via the channel.

5. The system of claim 1 wherein two valves are adjustable together by a single adjustment unit to place the fluid displacement regions of the two valve bodies simultaneously in fluidic communication with the fluid sample processing region in one position and to isolate the fluid displacement regions of the two valve bodies from the fluid sample processing region in another position.

6. The system of claim 1 wherein the external port of at least one of the valve bodies is disposed on one external port surface of the valve body.

7. The system of claim 6 wherein the external port surface is generally conical with respect to an axis.

8. The system of claim 7 wherein the valve body is rotatable around the axis of the external port surface and relative to the plurality of chambers to allow the external port to be placed selectively in fluidic communication with the plurality of chambers, the external port being spaced from the axis by a radius.

9. The system of claim 8 wherein the valve body is rotatable around the axis of the external port surface to allow the external port spaced from the axis by the radius to be placed selectively in fluidic communication with the fluid sample processing region.

10. The system of claim 8 further comprising a channel having two ends and disposed between the valve bodies of two valves, wherein the valve bodies of the two valves are adjustable with respect to the channel to allow the external ports of the two valves spaced from the axis to be placed selectively in fluidic communication with the two ends of the channel.

11. The system of claim 1 wherein the fluid displacement region is depressurizable by increasing in volume and is pressurizable by decreasing in volume.

12. The system of claim 11 further comprising a fluid displacement member disposed in the fluid displacement region, the fluid displacement member being movable to adjust the volume of the fluid displacement region.

13. The system of claim 12 wherein the fluid displacement member comprises a piston movable in a linear direction in the fluid displacement region.

14. The system of claim 1 wherein the fluid sample processing region comprises an active member selected from the group consisting of a microfluidic chip, a solid phase material, a filter, a filter stack, an affinity matrix, a magnetic separation matrix, a size exclusion column, and a capillary tube.

15. The system of claim 1 wherein the body including the fluid sample processing region is formed in one of the valves with the fluid sample processing region in continuous fluidic communication with the fluid displacement region of the one valve.

16. The system of claim 15 further comprising a second fluid sample processing region, and wherein the plurality of valves are adjustable with respect to the second fluid sample processing region to place the external port selectively in fluidic communication with the second fluid sample processing region.

17. The system of claim 16 wherein the valve with the fluid displacement region in continuous fluidic communication with the fluid sample processing region includes a plurality of external ports which are selectively placed in fluidic communication with the second fluid sample processing region and the plurality of chambers.

18. A fluid control and processing system for controlling fluid flow among a plurality of chambers, the system comprising:
a body including a fluid sample processing region; and
a plurality of valves, each valve including a valve body having a fluid displacement region which is depressurizable to draw fluid into the fluid displacement region and pressurizable to expel fluid from the fluid displacement region, the valve body including an external port, the fluid displacement region being fluidicly coupled with the external port of the valve body, the valve body being adjustable with respect to the fluid sample processing region to place the external port selectively in fluidic communication with the fluid sample processing region, and the valve body being adjustable with respect to the plurality of chambers to allow the external port to be placed selectively in fluidic communication with the plurality of chambers.

19. The system of claim 18 wherein two valves are adjustable together by a single adjustment unit to place the fluid displacement regions of the two valve bodies simultaneously in fluidic communication with the fluid sample processing region in one position and to isolate the fluid displacement regions of the two valve bodies from the fluid sample processing region in another position.

20. The system of claim 18 wherein the valve bodies of the valves are separately adjustable to place the external ports of the valve bodies selectively in fluidic communication with the fluid sample processing region or with the chambers, and wherein the fluid displacement regions of the valves are separately pressurizable and depressurizable.

21. The system of claim 18 wherein the valve body of each valve is rotatably adjustable around an axis and relative to the fluid sample processing region and the plurality of chambers to place the external port selectively in fluidic communication with the fluid sample processing region or with the plurality of chambers.

22. A method for controlling fluid flow between a plurality of valves and a plurality of chambers and a fluid processing region, each valve including an external port and a fluid displacement region fluidicly coupled with the external port, the method comprising:
adjusting the valves with respect to the plurality of chambers and the fluid processing region to place the external ports of the valves selectively in fluidic communication with the plurality of chambers and the fluid processing region.

23. The method of claim 22 wherein each valve is adjustable to close the external port so that the valve is fluidicly isolated from the chambers and the fluid processing region.

24. The method of claim 22 wherein one valve is adjusted to place the external port in fluidic communication with one chamber, and further comprising depressurizing the fluid displacement region of the valve to aspirate fluid from the chamber into the valve.

25. The method of claim 22 wherein one valve is adjusted to place the external port in fluidic communication with one chamber, and further comprising pressurizing the fluid displacement region of the valve to expel fluid from the valve into the chamber.

26. The method of claim 22 further comprising applying a magnetic field to the fluid processing region.

27. The method of claim 22 wherein the valve body of the valve is rotatable around an axis and relative to the fluid processing region and the plurality of chambers to allow the external port of the valve to be placed selectively in fluidic communication with the fluid processing region and the plurality of chambers.

28. The method of claim 22 wherein the valve bodies of two valves are adjusted to place the external ports of the two valves in fluidic communication with the fluid processing region, and further comprising synchronizing pressurization and depressurization of the fluid displacement region of one of the two valve bodies, respectively, with depressurization and pressurization of the fluid displacement region of the other of the two valve bodies to move a fluid back or forth between the two fluid displacement regions through the fluid processing region.

29. The method of claim 22 further comprising adjusting the valve bodies of two valves to place the external ports of the two valve in fluidic communication with two ends of a channel, and further comprising synchronizing pressurization and depressurization of the fluid displacement region of one of the two valve bodies, respectively, with depressurization and pressurization of the fluid displacement region of the other of the two valve bodies to move a fluid back and forth between the two fluid displacement regions through the channel.

30. The method of claim 22 wherein two valves are adjustable together by a single adjustment unit to place the fluid displacement regions of the two valve bodies simultaneously in fluidic communication with the fluid sample processing region in one position and to isolate the fluid displacement regions of the two valve bodies from the fluid sample processing region in another position.

* * * * *